J. BURGER.
Hog-Ringing Pinchers.
No. 147,367. Patented Feb. 10, 1874.
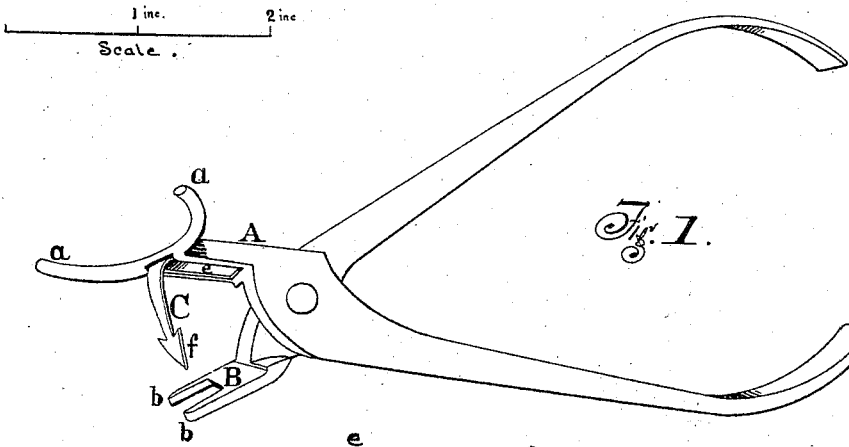
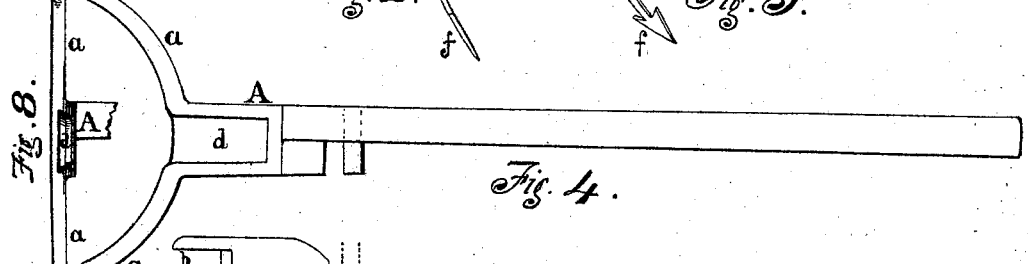
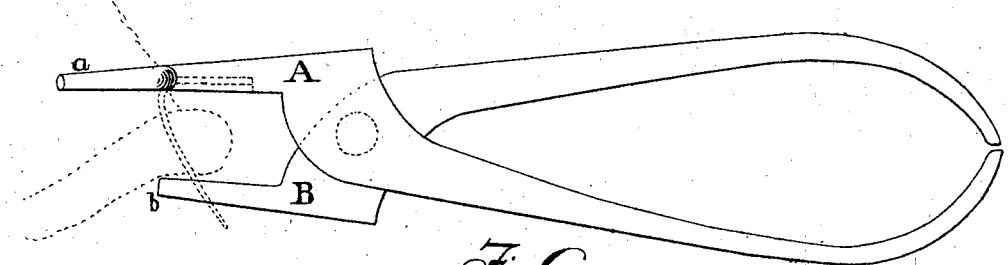

UNITED STATES PATENT OFFICE.

JOSEPH BURGER, OF FAIRBURY, ILLINOIS.

IMPROVEMENT IN HOG-RINGING PINCHERS.

Specification forming part of Letters Patent No. 147,367, dated February 10, 1874; application filed July 15, 1873.

*To all whom it may concern:*

Be it known that I, JOSEPH BURGER, of Fairbury, in the county of Livingston and in the State of Illinois, have invented an Improvement in Hog-Ringing Pinchers; and do hereby declare that the following is a full, clear, and exact description thereof, reference being had to the annexed drawings, making a part of this specification, in which like letters of reference refer to like parts, and in which—

Figure 1 represents a perspective view of the "inserter" or pinchers, carrying the nose-ring ready for insertion; Fig. 2, side elevation of nose piece or ring; Fig. 3, perspective view of latter; Fig. 4, view of under side of upper half of pinchers or inserter, showing recess for retention of ring; Fig. 5, view of under side of lower half of pinchers; Fig. 6, side elevation of pinchers, showing hog's "snout," and the pinchers closed after the insertion of the ring; Fig. 7, vertical section, longitudinally, of the upper jaw of the pinchers, to show recess for retention of plate of nose-ring; Fig. 8, view of end of upper jaw of pinchers, showing recess.

This invention relates to a pair of pinchers having one of the jaws provided with curved lateral arms and a recess to receive a barbed hook or ring for insertion in the hog's nose, and the other with a bifurcated end, as will be hereinafter more fully explained, and pointed out in the claim.

In the drawings, A represents the upper jaw of the pinchers, terminating in front in two lateral curved arms, $a$ $a$, of sufficient length to partly inclose the front of the animal's snout during the insertion of the barb or nose-ring C. Behind these, and beneath the jaw, is a recess, $d$, about three-fourths of an inch in length from front to rear, one-third of an inch wide, and about one-sixteenth of an inch deep, having its sides constructed with flanges or projections, to retain the flat terminal plate $e$ of the barbed hook or nose-ring C. The recess may be placed above the jaw with equal utility. B represents the lower jaw of the pinchers, and is in form flat, of same size as the upper jaw, to which it is parallel when the pinchers are closed, leaving a distance between each of about three-fourths of an inch. This jaw ends in a bifurcation, $b$ $b$, all in the same plane. Said bifurcations terminate opposite and below the base of the upper arms $a$ $a$, and inclose a recess measuring half an inch in diameter each way.

C represents the hook or barbed nose-piece, which resembles a short arrow, having at one end a flat plate, $e$, before described, which, when the hook is stamped from the sheet of metal, is in the same plane with the barb $f$. The hook C is bent close to the said plate, at an acute angle, resembling, when thus shaped, a cultivator-shovel, stem, and beam united. A convenient size for the hook or nose-piece C is about one and one-half inch in length, (cut out of one-sixteenth-inch iron sheets, or plates of a less thickness,) the barb $f$ being about one-fourth of an inch in length, the plate $e$ one-half an inch long by one-third of an inch in width.

The operation of this nose-ring and pinchers is as follows: The plate $e$ of the former is inserted, with the barb $f$ downward, in the recess $d$ of the upper jaw A of the pinchers or inserter, and the barb or ring is ready for insertion in the hog's nose. The latter is properly secured or held, the jaws of the pinchers are widened to their fullest extent, and the curved arms $a$ $a$ are pressed against the front of the animal's nose, so that any lateral motion of the latter will not displace the pinchers. The arms $b$ $b$ of the lower jaw B are placed at the same time against the flat part of the nostril, and the pincher-jaws are brought together. The barb $f$, by this action, is driven neatly through the nose, at the usual place, and is prevented from being pulled out by the barbed points, $f$, below, and the flat bent plate or stem $e$ above, which now lies on the animal's snout.

What I claim as my invention is—

A pair of pinchers having one of the jaws provided with curved lateral arms $a$ and recess $d$, to receive a barbed hook or ring, $e$ $f$, and the other with a bifurcated end, $b$ $b$, substantially as and for the purpose set forth.

In testimony that I claim the foregoing hog-ring and inserter I have hereunto set my hand this 7th day of July, A. D. 1873.

JOSEPH BURGER.

Witnesses:
W. W. WELLS.
JOHANNES BRONSON.